US011878872B2

(12) United States Patent
Cipriani

(10) Patent No.: US 11,878,872 B2
(45) Date of Patent: Jan. 23, 2024

(54) PORTABLE CONVEYOR ROLLER DISLODGING DEVICE

(71) Applicant: Andrew K. Cipriani, Myrtle Beach, SC (US)

(72) Inventor: Andrew K. Cipriani, Myrtle Beach, SC (US)

(*) Notice: Subject to any disclaimer, the term of this patent is extended or adjusted under 35 U.S.C. 154(b) by 86 days.

(21) Appl. No.: 17/496,370

(22) Filed: Oct. 7, 2021

(65) Prior Publication Data
US 2022/0106128 A1  Apr. 7, 2022

Related U.S. Application Data

(60) Provisional application No. 63/088,670, filed on Oct. 7, 2020.

(51) Int. Cl.
*B65G 13/075* (2006.01)
*B65G 13/02* (2006.01)
*B65G 43/02* (2006.01)

(52) U.S. Cl.
CPC ............ *B65G 43/02* (2013.01); *B65G 13/02* (2013.01); *B65G 13/075* (2013.01); *B65G 2203/0275* (2013.01)

(58) Field of Classification Search
CPC ...... B65G 43/02; B65G 13/02; B65G 13/075; B65G 2203/0275
See application file for complete search history.

(56) References Cited

U.S. PATENT DOCUMENTS

| 3,765,587 A * | 10/1973 | Davis ................ B23Q 7/03 227/100 |
| 4,488,638 A | 12/1984 | Morgan et al. |
| 4,579,213 A | 4/1986 | Rhine et al. |
| 5,226,604 A * | 7/1993 | Seiffert ................ B02C 13/095 241/34 |
| 5,996,314 A | 12/1999 | Pennini et al. |
| 6,860,381 B2 | 3/2005 | Newsom et al. |
| 8,755,933 B2 | 6/2014 | Repp et al. |
| 10,029,895 B2 * | 7/2018 | Grosse ...................... B66F 9/07 |
| 11,443,126 B2 * | 9/2022 | Cohen ................ G06K 7/10366 |
| 2014/0224624 A1 * | 8/2014 | DePaso .................. B65G 15/62 198/837 |
| 2018/0127192 A1 | 5/2018 | Cohen |

FOREIGN PATENT DOCUMENTS

CN      114906566 B  *  8/2023

OTHER PUBLICATIONS

Jokonya, Automated Operations of a Mining Machine, Feb. 7, 2013, WIPO, AU 2012289908 A1 (see office action for pertinent pages) (Year: 2013).*

* cited by examiner

*Primary Examiner* — Gene O Crawford
*Assistant Examiner* — Lester Rushin, III
(74) *Attorney, Agent, or Firm* — P. Jeff Martin; The Law Firm of P. Jeffrey Martin, LLC

(57) ABSTRACT

A portable roller dislodging device is disclosed. The device is configured to dislodge a jammed roller of a conventional conveyor. The device may be detachably secured to the rail of the conveyor about any selectively-desired position. The device includes a motor, a rotating motor shaft, and a means for coupling the motor shaft to the jammed roller to facilitate dislodgement thereof. The device may be operated remotely via a wireless remote control device.

10 Claims, 6 Drawing Sheets

PORTABLE CONVEYOR ROLLER DISLODGING DEVICE

I. RELATED APPLICATIONS

This application claims priority to U.S. Provisional Patent Application No. 63/088,670, filed on Oct. 7, 2020, the disclosure of which is hereby incorporated by reference in its entirety.

II. FIELD OF THE INVENTION

This application discloses claims and embodiments generally related to dislodging equipment and devices, and more particularly, to a portable device adapted and configured to dislodge a stationary or jammed roller of a conveyor.

III. BACKGROUND OF THE INVENTION

Currently there exists in the art various accumulating rolling conveyors and automatic vending equipment and apparatuses. A number of these conveyors and vending apparatuses incorporate jam protection features. However, the devices and apparatuses taught by the prior art are permanently fixed to the conveyors and utilize central processing means (e.g.; a microprocessor), software programs and modules for generating no drive signals which stop affected rollers for a predetermined interval. Upon expiration of the stop interval, signals are generated to return the rollers to a drive mode, regardless whether a jammed roller has become dislodged. The prior art devices fail to teach or suggest means for actual dislodgment of a fixed or jammed roller.

In addition, the prior art fails to teach or suggest a device for dislodging a roller of a conveyer which may be removably attached to the rail of a conveyor in a selectively-desired position, any number of times, and which may be remotely controlled.

A search of the prior art did not disclose any patents that read directly on the claims of the instant invention; however, the following references were considered related:
U.S. Pat. No. 6,860,381 B2, issued in the name of Newsom et al.;
U.S. Pat. No. 4,579,213, issued in the name of Rhine et al.;
U.S. Pat. No. 4,488,638, issued in the name of Morgan et al.;
U.S. Patent Publication No. 2018/0127192 A1, published in the name of Cohen;
U.S. Pat. No. 8,755,933 B2, issued in the name of Repp et al.; and
U.S. Pat. No. 5,996,314, issued in the name of Pennini et al.

This application presents claims and embodiments that fulfill a need or needs not yet satisfied by the products, inventions and methods previously or presently available. In particular, the claims and embodiments disclosed herein describe a portable conveyor roller dislodging device, the dislodging device comprises a motor; a motor shaft; a roller engaging means; a wireless remote control device; a controller comprising a transmitter and wireless receiver; a power supply; and a coupling means for detachably securing the dislodging device to one side rail of a conveyor, wherein the dislodging device of the present invention providing unanticipated and nonobvious combination of features distinguished from the devices, apparatuses, inventions and methods preexisting in the art. The applicant is unaware of any device, apparatus, method, disclosure or reference that discloses the features of the claims and embodiments disclosed herein, and as more fully described below.

IV. SUMMARY OF THE INVENTION

In one embodiment, a portable roller dislodging device is disclosed. The device is configured to dislodge a jammed roller of a conventional conveyor. The dislodging device comprises a motor, a motor shaft, a roller engaging means, a wireless control device for controlling operation of the dislodging device remotely, a controller comprising a transmitter and wireless receiver, a power supply, and a coupling means for detachably securing the dislodging device to one of the parallel side rails of a conventional conveyor. The motor, controller, and power supply are enclosed within a protective housing.

According to one embodiment, the roller engaging means couples the motor shaft to the jammed roller. Activation of the motor actuates rotation of the motor shaft, thereby facilitating dislodgement of the jammed roller.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

VI. DETAILED DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
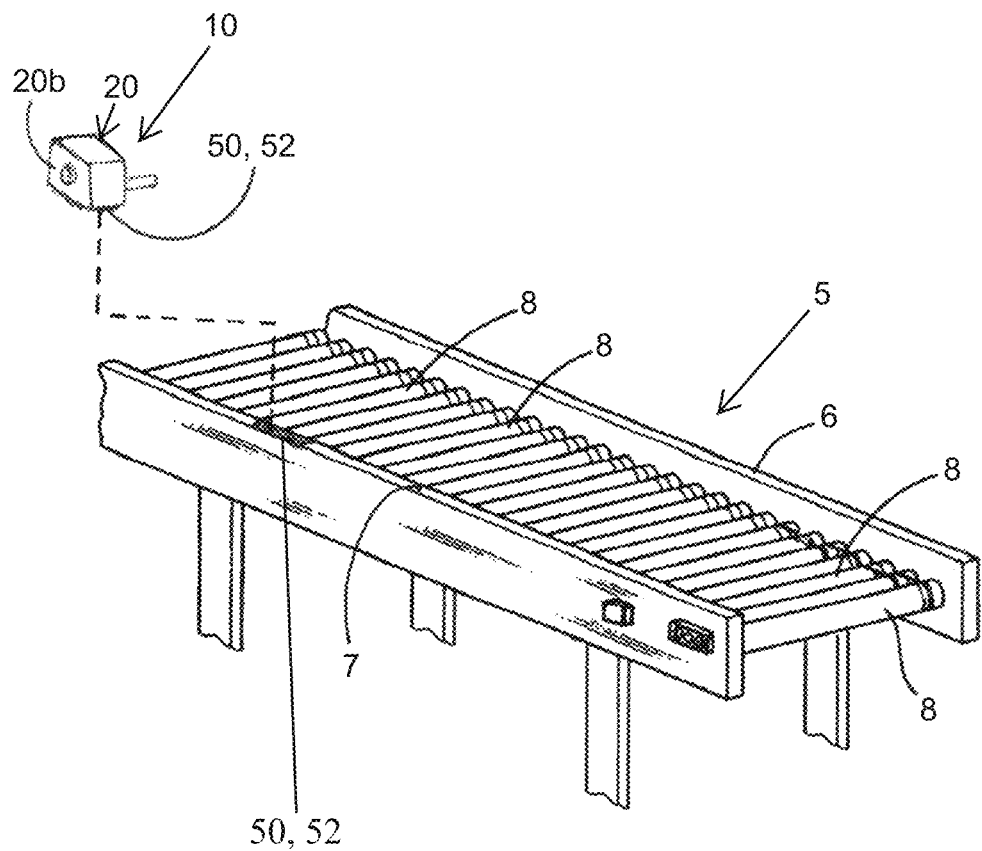
FIG. 1 is an exploded, perspective view of a section of a portable conveyor depicting the detachable coupling of a portable conveyor roller dislodging device to one of the parallel side rails of the conveyor, in accordance to one embodiment of the present invention.
Figure 2:
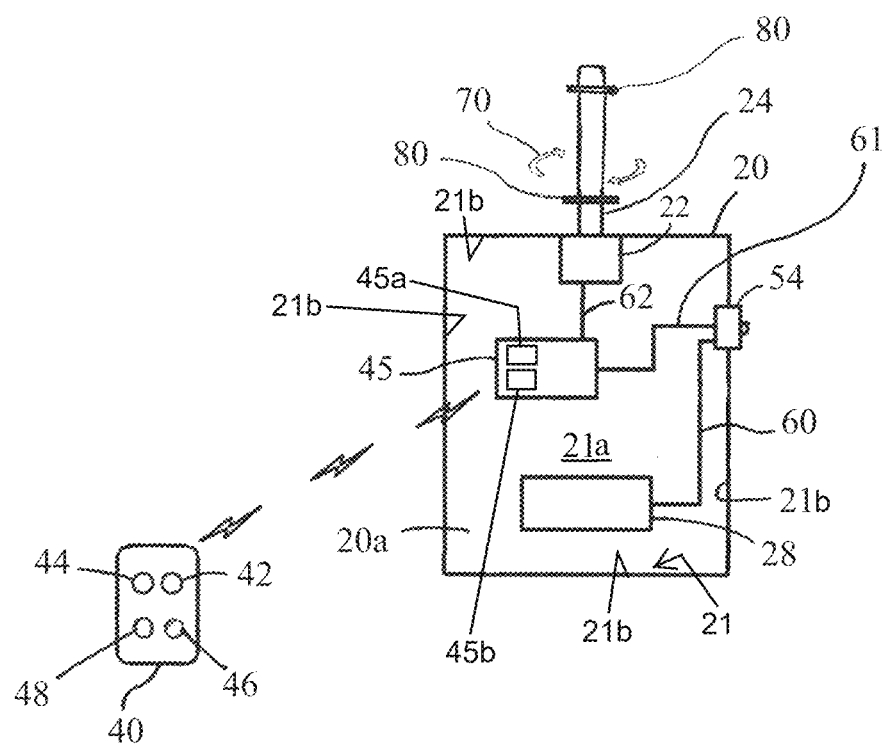
FIG. 2 illustrates by schematic view portions of an exemplary implementation of the portable conveyor roller dislodging device of FIG. 1.
Figure 3:
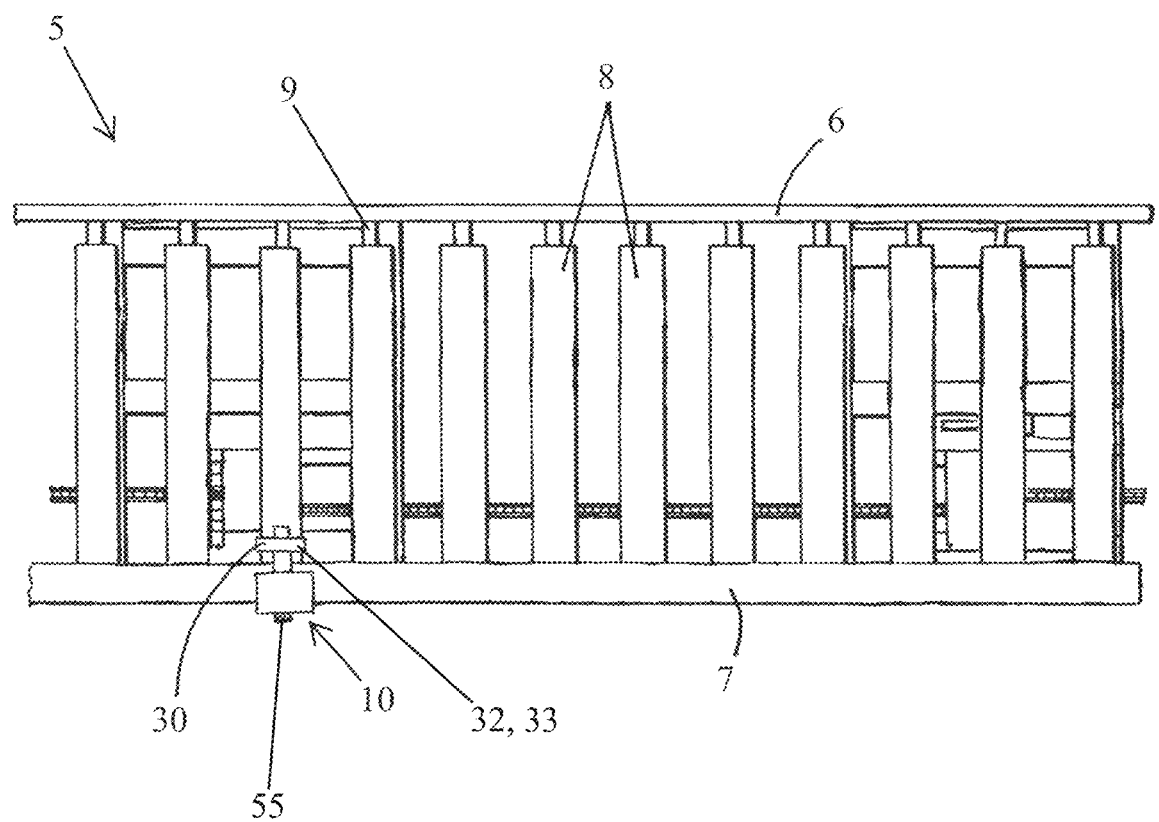
FIG. 3 is a top plan view of a conventional conveyor showing a dislodging device detachably coupled to a side rail of the conveyor, in accordance to one embodiment of the present invention.

Consistent with the illustrations appended hereto, as embodied in FIGS. 1-3, a portable conveyor roller dislodging device, generally designated at 10 is disclosed, in accordance to one embodiment of the present invention. The portable conveyor roller dislodging device, hereinafter "dislodging device 10", is adapted and configured to dislodge a stationary, lodged, jammed, or fixed roller of a conventional conveyor. As one example, and consistent with that depicted in FIGS. 1 and 3, a conventional conveyor 5 includes parallel, linear-elongated conveyor side rails 6 and 7 and a series of rollers 8 mounted perpendicularly on shafts 9 between the side rails 6 and 7. The dislodging device 10 comprises a motor 22, a motor shaft 24, a roller engaging means 30, a wireless remote control device 40, a controller 45 comprising a transmitter 45a and wireless receiver 45b, a power supply 28, and a coupling means 50 for detachably securing the dislodging device 10 to one of the parallel side rails 6 and 7. The motor 22, controller 45, and power supply 28 are enclosed within a housing 20, the housing 20 protecting electrical circuitry and components, and mechanical components therein. The power supply 28 may comprise one or more rechargeable batteries.

The housing 20 defines a hollow interior 20a having an inner surface 21 comprising a floor 21a and a plurality of sidewalls 21b. Motor 40 is secured to inner surface 21 of housing 20 such that the motor shaft 24 extends outwardly from the housing 20. In accordance to one embodiment, the motor 22 is an electric motor generally configured to rotate the motor shaft 24. The controller 45 is in electrical communication with power supply 28 by pathway 60. Pathway 60 passes through a switch 54 in the form of a single pole, single throw switch, depicted as a rotary knob 55, in accordance to the embodiment illustrated in FIG. 3. The knob 55 is mounted to an outer surface 20b of housing 20 in this implementation, may be turned or rotated by a user between an OFF position and an ON position to control the flow of electrical power from the power supply 28 to the controller 45. Other switches 54, such as push button and toggle switches (neither shown), are envisioned for controlling the flow of electrical power from the power supply 28 to the controller 45, and are therefore within the liberty and scope of the present application. For example, in accordance to one exemplary embodiment, a toggle type switch may be toggled by the user between an OFF position and an ON position to control the flow of electrical power from the power supply 28 to the controller 45.

The switch 54 allows the motor 22 to be powered ON and OFF manually without the use of the remote control device 40. Thus, the motor 22 is interconnected to the power supply 28 via switch 54. As depicted in FIG. 2, the switch 54 is in electrical communication with the controller 45 by pathway 61, and the controller 45 is in electrical communication with the motor 22 by pathway 62, to control the flow of electrical power from the power supply 28 to the motor 22, and to control the operation of the motor 22. The controller 45 may transmit analog control signals, digital control signals, or combinations thereof along pathway 62 to control the operation of the motor 22.

The controller 45 is adapted to receive wireless signals from the remote control device 40 (wireless transmitter) with the wireless signals adapted to direct the controller 45 to actuate the motor 22 to rotate the motor shaft 24. Accordingly, the operation of the motor 22 may be controlled by the wireless remote control device 40 through wireless communications of wireless signals between the remote control device 40 and the controller 45.

The coupling means 50 allows the dislodging device 10 to be detachably secured to one of the parallel side rails 6 and 7, proximate a lodged roller 8. The coupling means 50 may comprise clamps, brackets, hook-and-loop fastener systems, adhesives, and the like. The coupling means 50 is illustrated herein as a hook-and-loop fastener system 52. However, other suitable coupling means 50 are envisioned, and the hook-and-loop fastener system 52 is not intended to be limiting, but rather exemplary. The coupling means 50 and the lightweight, portable characteristics defining the dislodging device 10 combine to allow the device 10 to be detachably secured to a chosen rail 6 or 7 of the conveyor 5 about any selectively-desired position there along.

In accordance to one embodiment depicted in FIG. 2, the user may press button 42 on the remote control device 40, thereby transmitting a wireless signal therefrom to the controller 45, the wireless signal causing the controller 45 to activate the motor 22, thereby rotating the motor shaft 24, as indicated by arrows 70 in FIG. 2. The user may press button 44 on the remote control device 40, thereby transmitting a wireless signal therefrom to the controller 45, the wireless signal causing the controller 45 to deactivate the motor 22, thereby stopping rotation of the motor shaft 24. In various implementations, the user may be able to control the rate of rotation of the motor shaft 24 by the motor 22. For example, the user may push button 46 on the remote control 40 thereby transmitting a wireless signal therefrom to the controller 45, the wireless signal causing the controller 45 to increase the speed at which the motor shaft 24 rotates or otherwise spins. The user may push button 48 on the remote control 40 thereby transmitting a wireless signal therefrom to the controller 45, the wireless signal causing the controller 45 to decrease the speed at which the motor shaft 24 rotates or otherwise spins.

One or more stops 80 may be provided along the motor shaft 24 to limit the traversal of the roller engaging means 30 along the shaft 24 as the shaft 24 rotates.

Referring now more particularly to FIGS. 2 and 3, in accordance to one embodiment, the roller engaging means 30 comprises a flexible, durable, elongated belt 32 having opposed free ends adapted and configured to be releasably attached to one another, thereby forming a fixedly-secured closed-looped, circular belt 33. In the event one or more rollers 8 become lodged, the user detachably secures the dislodging device 10, via the coupling means 50, superjacent the upper surface of one of the parallel side rails 6 or 7, proximate the lodged roller 8. In the embodiment illustrated in FIG. 3, the dislodging device 10 is shown secured atop side rail 7. The dislodging device 10 is positioned such that the motor shaft 24 faces the opposing side rail (depicted in FIG. 3 as side rail 6 in this example), and the motor shaft 24 is aligned axially with the lodged roller 8. Next, the user engages the belt 30 against the lower, external circumferential sidewall of the lodged roller 8, releasably attaches the first free end to the second free end of the belt 30, and loops the belt 30 around the motor shaft 24. User then turns or toggles the switch 54 to the ON position, which powers on the motor 22 actuating rotation by the motor shaft 24. Alternatively, user may press button 42 on the remote control device 40, thereby activating, or otherwise powering on the motor 22 which actuates rotation by the motor shaft 24. Finally, user stops shaft 24 rotation by either turning or toggling the switch 54 to the OFF position, or by pressing button 44 on the remote control device 40 which deactivates the motor 22, thus stopping rotation of the motor shaft 24.

In accordance to another embodiment, the roller engaging means 30 may comprise an annular belt. In the event a roller 8 of a conveyor 5 becomes lodged, the user detachably secures the dislodging device 10, via the coupling means 50, superjacent the upper surface of the parallel side rail 6 or 7 proximate the lodged roller 8. Next, user decouples the shaft 9 of the lodged roller 8 from the side rail 6 or 7, loops the annular belt around the lodged roller 8 and the motor shaft 24, and reattaches the shaft 9 to the side rail 6 or 7. Finally, user repeats the steps as previously described.

Figure 4:
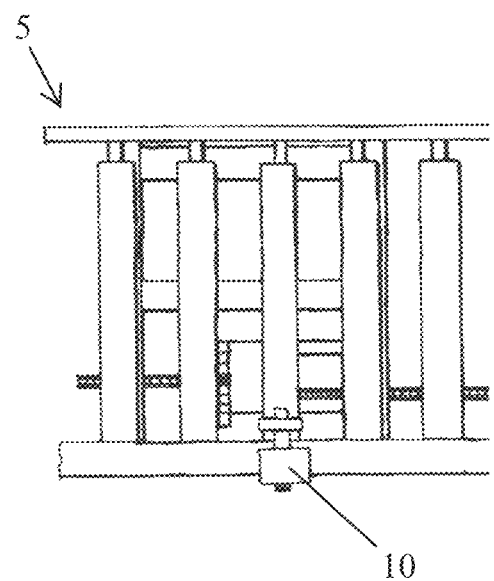
FIG. 4 illustrates an exemplary wireless dislodging device control configuration provided by a mobile electronic device.
Figure 4:
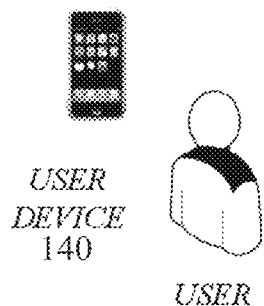

Referring now to FIG. 4, in accordance to another embodiment, the dislodging device 10 comprises a motor 20, a motor shaft 22, a roller engaging means 30, a phone application downloadable, purchasable, etc., via an electronic computer device (e.g.; a mobile electronic device 140, such as a smartphone, or any device with a memory and processor), a controller 45, and a coupling means 50 for detachably securing the dislodging device 10 to one of the parallel side rails 6 and 7. Any references to a computer or electronics device may be directed to a wireless mobile, wireless or cellular phone, computer, laptop, a PDA, a tablet, a client server, or any device that contains a processor and/or memory, whether that processor or memory performs a function related to an embodiment of the phone application.

FIG. 4 illustrates an exemplary wireless roller dislodging device control application configuration provided by a mobile device 140. The dislodging device 10 includes a decoy body controller 45 comprising a wireless receiver configured to receive any of a WIFI communication signal, a BLUETOOTH communication signal, an infrared communication signal, a near field communication signal, a RF signal, etc. The wireless receiver is adapted and configured to receive communication signals from the user device 140, depicted herein as a smartphone.

In operation, the user may enact a roller dislodging device control application on the mobile device 140 and a wireless communication signal may cause the motor shaft 24 of the dislodging device 10 to rotate. In this example, the first command (shaft rotation) is transmitted to the controller 45 of the dislodging device 10 to activate the motor 22, causing the motor shaft 24 to rotate when the controller 45 receives a movement command from a corresponding processor and memory in communication with the controller 45 inside the housing 20 of the dislodging device 10. The next command (stop shaft rotation) is transmitted to the controller 45 of the dislodging device 10 to deactivate the motor 22, causing the motor shaft 24 to stop rotating when the controller 45 receives the stop movement command from the corresponding processor and memory in communication with the controller 45.

Figure 5:
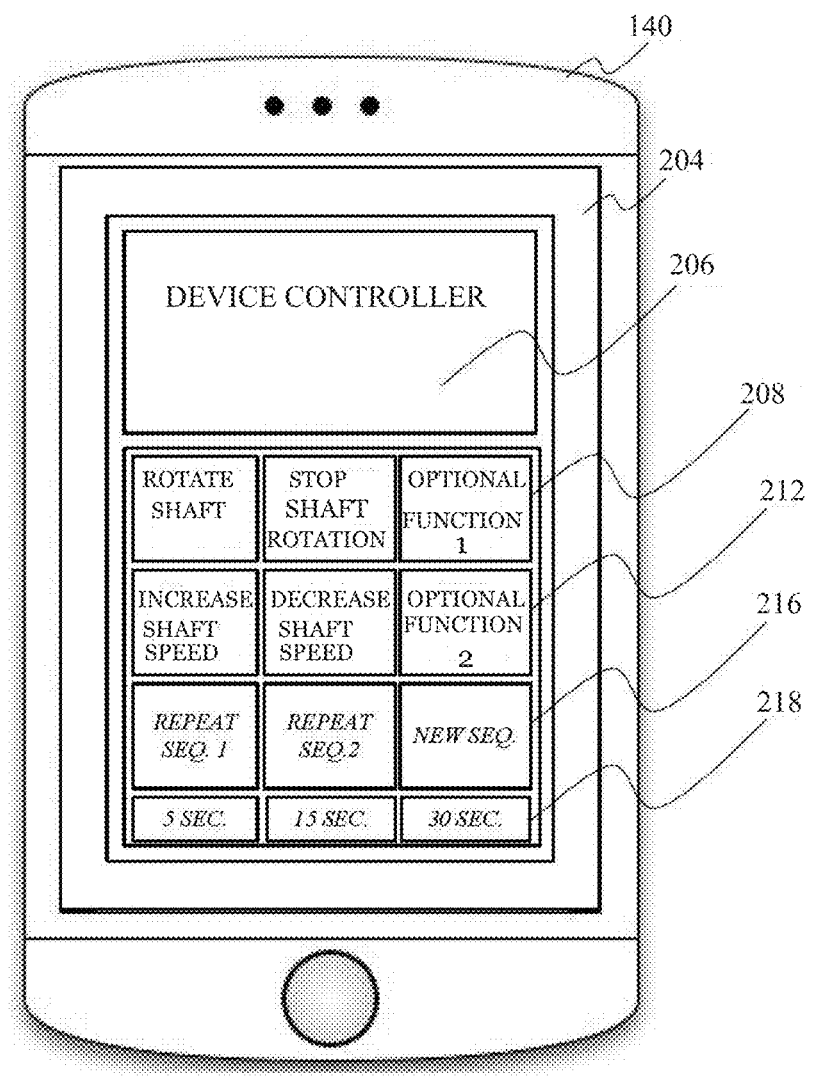
FIG. 5 illustrates a user interface on a mobile electronic device for controlling the dislodging device operation remotely, in accordance to one embodiment of the present invention.

In reference to FIG. 5, a user interface on a mobile device 140 for controlling the dislodging device operation remotely is depicted. The exemplary user interface 200 includes a mobile device 140, a display 204 an application 206 used to control the dislodging device 10 and various modes of operations and commands which are preset on the display interface. In this example, the commands may include rotating the shaft 24 or stopping shaft rotation 208, and increasing or decreasing shaft speed 212. The commands may further include rotating the motor shaft 24 over a predetermined period of time 218, such as 5 seconds, 15, seconds, 30 seconds. Additionally, the commands may include creating a new sequence, repeating a previously created sequence, etc. 216. The sequences may have at least one movement command for at least one shaft rotation speed (Optional Function 1 and Optional Function 2) and at least one period of time in the event there are additional movements. The time periods 216 may also be selected for each command to ensure the next command is buffered by the predetermined period of time. For example, a sequence may include 1-2 or more movement operations which alternate between the operations and which include periods of time between each command which varies to create a more organic and arbitrary movement sequence.

Figure 6:
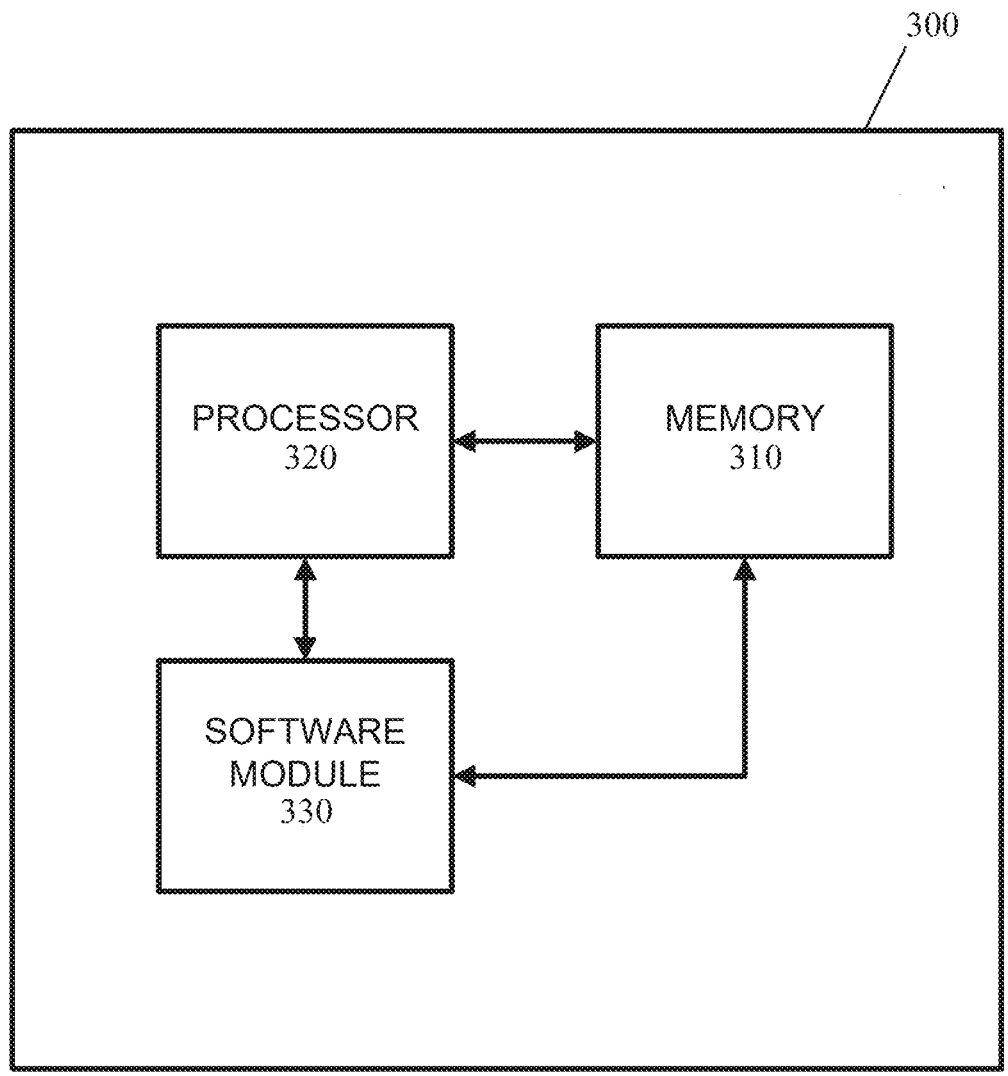
FIG. 6 illustrates a computer entity processing system configured to embody the example application used to control the dislodging device remotely.

FIG. 6 illustrates a computer entity processing system configured to embody the example application used to control the decoy remotely. The operations of the above-described embodiments, method or algorithm may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 300, which may represent any of the above-described network components, etc.

As illustrated in FIG. 6, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 230 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored indifferent locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A portable dislodging device comprising:
    a motor;
    a motor shaft;
    a roller engaging means;
    a controller;
    a power supply; and
    a coupling means, wherein the motor, the motor shaft, the roller engaging means, the controller, the power supply, and the coupling means being combined to form a portable dislodging device for dislodging a stationary, lodged, jammed, or fixed roller of a conveyor having parallel, linear-elongated conveyor side rails and a series of rollers mounted perpendicularly on respective shafts mounted between the parallel, linear-elongated conveyor side rails, and wherein the coupling means for detachably securing the portable dislodging device to one side rail of the parallel, linear-elongated conveyor side rails of the conveyor.

2. A portable dislodging device comprising:
    a motor;
    a motor shaft;
    a roller engaging means;
    a wireless remote control device;
    a controller comprising a transmitter and a wireless receiver;
    a power supply;
    a housing enclosing the motor, the controller, and the power supply; and
    a coupling means, wherein the motor, the motor shaft, the roller engaging means, the controller, the power supply, and the coupling means being combined to form a portable dislodging device for dislodging a stationary, lodged, jammed, or fixed roller of a conveyor having parallel, linear-elongated conveyor side rails and a series of rollers mounted perpendicularly on respective shafts mounted between the parallel, linear-elongated conveyor side rails, and wherein the coupling means for detachably securing the portable dislodging device to one side rail of the parallel, linear-elongated conveyor side rails of the conveyor.

3. The portable dislodging device of claim 2, wherein the roller engaging means comprises a flexible, durable, elongated circular belt.

4. The portable dislodging device of claim 2, wherein the coupling means comprises a hook-and-loop fastener system.

5. A method for remotely controlling a dislodging device stored on a non-transitory computer readable storage medium configured to store instructions when executed cause a processor to perform:
   receiving at least one wireless command sequence from a mobile electronic device operating a dislodging device movement application, the at least one wireless command sequence comprising:
      rotating a motor shaft of the dislodging device for dislodging a stationary, lodged, jammed, or fixed roller of a conveyor having parallel, linear-elongated conveyor side rails and a series of rollers mounted perpendicularly on respective shafts mounted between the parallel, linear-elongated conveyor side rails; and
      stopping the motor shaft rotation.

6. The method of claim 5, wherein the processor is further configured to perform step of:
   increasing a speed of the motor shaft.

7. The method of claim 5, wherein the processor is further configured to perform step of:
   decreasing a speed of the motor shaft.

8. The method of claim 5, wherein the processor is further configured to perform step of:
   rotating the motor shaft over a predetermined period of time.

9. The method of claim 5, wherein the processor is further configured to perform step of:
   creating a command sequence.

10. The method of claim 5, wherein the processor is further configured to perform step of:
    repeating a previously created command sequence.

* * * * *